Patented Oct. 8, 1935

2,016,736

UNITED STATES PATENT OFFICE 2,016,736

TREATMENT OF RUBBER SURFACES

John W. Baymiller, Springfield, Mass., assignor to William C. Geer, Ithaca, N. Y.

No Drawing. Application May 31, 1932, Serial No. 614,639

9 Claims. (Cl. 91—68)

This invention relates to the treatment of rubber or similar surfaces such, for example, as balata, gutta percha or synthetic rubber compounds, and more particularly to a method for improving the character of the surface of a golf ball or other article having a surface of rubber or similar material.

It is an object of this invention to provide a method for smoothing out slight imperfections or unevenness in the surface of the article, such, for example as the marks left by foreign matter on the surface of the mold. It is also an object to prepare the surface of an article which is to be subjected to a chemical treatment whereby a hard, integral and polishable surface is obtained. Other objects will become apparent.

As pointed out in application Serial No. 542,192, filed June 4, 1931 by William C. Geer, a rubber article having improved characteristics may be prepared by subjecting the surface of the article to the action of a halide of an amphoteric element, for example, tin tetrachloride, in a suitable reactive and/or non reactive solvent, such as ethyl acetate or ethylene dichloride, respectively.

This invention includes an improvement in the procedure described in the above application whereby slight imperfections or unevenness in the surface of the article to be subjected later to the treatment of the halide of an amphoteric element may be changed to increase the smoothness of the finished article.

In the preparation of golf balls according to a method described in the above mentioned application, the pigmented surface of the ball is molded to give the desired shape and markings—such as dimple or mesh—to the surface. The ball is then subjected to the treatment with an anhydrous halide of an amphoteric element, after which the ball is preferably washed in a solvent which reacts with the addition product of the halide and rubber, and, if necessary, the ball is subjected to a polishing operation.

The condition of the inside surface of the mold determines to a large extent the amount of polishing necessary to give the desired appearance to the finished article. For example, if a very smooth high polished mold is used, the surface after treatment with the halide solutions may be polished merely by rubbing upon a cloth or upon a fabric or leather polishing wheel.

In the preparation of golf balls, it is extremely important that the surface be uniform and as smooth as possible to give the best flight and playing conditions and to take its high polish quickly. I have found that if the ball is subjected to the action of a solvent for the rubber, or other surface, after it is taken from the mold, whereby the outer surface may be made to flow slightly, the slight imperfections from the mold may be smoothed out and the ball, subsequently treated by the halide of the amphoteric element, will have an improved surface which may be more easily polished.

In carrying out my improved procedure, I prefer to proceed as follows:

The balls received from the mold are passed through the vapors above a boiling rubber solvent, such as carbon tetrachloride, for a sufficient time to permit the desired flowing of a microscopic thickness of the surface of the film; for example, about 1 to 3 seconds would ordinarily be sufficient for this purpose.

Other solvents which will disperse or dissolve the material of which the surface of the ball may be composed may be used in place of carbon tetrachloride. For example, with crude or unvulcanized rubber, gutta percha or balata, benzol, gasoline, butyl acetate, ethyl dichloride, carbon disulphide or other similar solvents may be used. The ball may be dipped in the liquid to give the desired solvent action to the outer film or the solvent may be sprayed upon the article, for example, in the form of a mist coat. I prefer, however, in treating a golf ball surface to subject it to the action of the hot vapors in order that the solvent will evaporate quickly and will not soak too deeply into the surface of the cover of the ball. For particular uses it may, of course, be desirable to subject the article to a greater solvent action.

After the solvent treatment referred to above, the balls are dried by evaporation and subjected to the treatment of the halide of an amphoteric element, for example, anhydrous tin tetrachloride, and washed as described above, preferably with a solvent that reacts with the addition product of the halide of the amphoteric element and the rubber or other surface material, for example, alcohol or acetone. The ball may then be readily polished to provide a hard, smooth surface with a low coefficient of friction. When the ball is subjected to the above described treatment, the solvent causes the microscopic film at the surface to disperse or dissolve and so to flow sufficiently to smooth out any slight unevenness which would tend to diffuse the light reflected from it and so permits the more complete reflection of the light and gives a more brilliant and quickly polished surface.

In referring to rubber in the above description and in the following claims, it is used in its non-technical sense and is intended to include natural or synthetic rubber, crude or deresinized balata, crude or deresinized gutta percha and materials of similar characteristics, used alone or with any other compounding ingredients, or as many together as may be desired and in any chosen proportions.

The pigment may be any suitable pigment for giving the desired color. For example, in the preparation of golf balls, titanium dioxide, zinc oxide, lithopone, barium sulphate or titanox may be used. Suitable accelerators and plasticizing agents to give the desired characteristic to the surface may, of course, be included with the rubber or similar material. Color stabilizers, such as magnesium oxide and/or glue and/or urea may be included in the rubber mixture to retard color changes after the tin tetrachloride treatment and subsequent washing.

The hardening treatment described in the above mentioned application may be accomplished by subjecting the ball to the action of the halide of an amphoteric element in a solvent or in the vapor phase and if preferred other methods may be used for chemically or physically hardening the surface of the rubber article.

Particular reference has been made to the use of this invention in the treatment of golf ball surfaces and although it is of great importance in such treatment, it is not intended to hereby limit its use to such an article. The terms which have been used in this application are used in their descriptive sense and not as terms of limitation and it is intended that the appended claims be construed to cover all equivalents thereof.

What I claim is:

1. A method of treating a rubber surface comprising subjecting it to the action of a solvent for the material of the surface for a sufficient time to cause a slight flowing of the surface so treated, and thereafter to the action of a halide of an amphoteric element.

2. A method for treating a surface of a rubber article, comprising subjecting the surface to the action of the vapors of a solvent for the material thereof for a sufficient time to cause a slight flowing of the surface, and subsequently subjecting the surface to the action of a halide of an amphoteric element.

3. A method of treating a rubber surface, comprising subjecting the surface to the action of the vapors of boiling carbon tetrachloride for a sufficient time to cause a slight flowing of the surface, and thereafter subjecting the surface to the action of a halide of an amphoteric element.

4. A method for treating a rubber article in which the surface thereof is subjected to the action of a solvent for the material of such surface, and subjecting the article to the action of a halide of an amphoteric element and subjecting the surface to the action of a solvent which will react with the addition product of the halide and the rubber.

5. A method for treating the surface of a golf ball composed substantially of rubber and a pigment comprising subjecting the surface to the action of a solvent for the rubber and thereafter subjecting the surface so treated to the action of a halide of an amphoteric element.

6. A method of treating the surface of a golf ball composed essentially of balata and a pigment comprising molding the surface and dipping it into the vapors of boiling carbon tetrachloride, thereafter dipping the ball in a solution of tin tetrachloride in ethylene dichloride and washing the surface in a solvent for the addition product of tin tetrachloride and the balata compound.

7. A method of treating a rubber surface, comprising subjecting it to the action of a solvent for the material of the surface for a sufficient time to cause a slight flowing of the surface so treated, and thereafter hardening the said surface of the article.

8. A method of treating a rubber surface, comprising subjecting it to the action of the vapors of boiling carbon tetrachloride for about 1 to 3 seconds and thereafter subjecting the surface to the action of a halide of an amphoteric element.

9. A method of treating a rubber surface comprising subjecting it to the action of a solvent for the material of the surface for a sufficient time to cause a slight flowing of the surface so treated, drying the said surface and thereafter treating it with a halide of an amphoteric element.

JOHN W. BAYMILLER.